Figure 1:
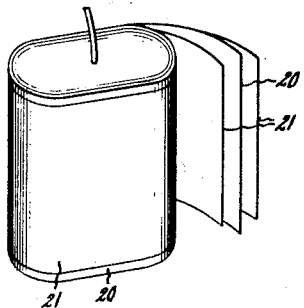

April 1, 1947.  E. A. KERN ET AL  2,418,354

DIELECTRIC SHEET MATERIAL

Filed Nov. 26, 1943   3 Sheets-Sheet 1

Inventors:
Edward A. Kern,
Harry F. Miller,
by Harry E. Dunham
Their Attorney.

April 1, 1947. E. A. KERN ET AL 2,418,354
DIELECTRIC SHEET MATERIAL
Filed Nov. 26, 1943 3 Sheets-Sheet 2

Inventors:
Edward A. Kern,
Harry F. Miller,
by Harry E. Dunham
Their Attorney.

Inventors:
Edward A. Kern,
Harry F. Miller,
by Harry E. Dunham
Their Attorney.

Patented Apr. 1, 1947

2,418,354

UNITED STATES PATENT OFFICE 2,418,354

DIELECTRIC SHEET MATERIAL

Edward A. Kern and Harry F. Miller, Pittsfield, Mass., assignors to General Electric Company, a corporation of New York Application November 26, 1943, Serial No. 511,778

4 Claims. (Cl. 117—155)

Our invention relates to a dielectric sheet material or film particularly suitable for high frequency application.

Heretofore a customary material for a dielectric between electrodes of a capacitor which has particular application to high frequency circuits has been mica. A condenser properly assembled, with mica as a dielectric, has a relatively low power factor in a high frequency range which may be in the vicinity of 0.1 per cent, a relatively small change in capacity with power factor and temperature, and a relatively high dielectric constant. However in the formation of mica capacitors particularly for high frequency applications there is considerable wastage in producing suitable mica splittings. It is therefore desirable to have a dielectric film which not only has electrical characteristics and particularly capacitance characteristics comparable with mica splittings but which also may be made synthetically and which may be controlled during its manufacture so as to consistently obtain suitable electrical properties with the minimum of wastage. Furthermore in many applications such as blocking and by-pass capacitors for high frequency, a higher power factor than mica has, is satisfactory, such as in the range of .5 to 2 per cent. The standard low frequency dielectric such as oil and paper is not ordinarily suitable for high frequency because power factor at high frequencies of these capacitors is considerably above the workable range. Furthermore, it is desirable to have a capacitor including a dielectric which has suitable electrical characteristics including stability of operation at temperatures above 100 degrees, such as up to 125 degrees C.

A dielectric film and capacitor employing the dielectric which may be formed so as to have relatively consistent electrical characteristics of the type described above and still have a minimum wastage in forming electrical apparatus are described and claimed in U. S. Patent 2,414,320, Miller and Foster, patented January 14, 1947. Such a dielectric includes a flexible porous dielectric material, such as paper, suitably impregnated or coated with a thermoplastic high softening point low power factor resinous material such as polyvinyl carbazole. This dielectric has a power factor in the vicinity of approximately one half of one per cent at around 100 degrees C. and at one megacycle, a high corona exciting voltage, and a satisfactory capacitance coefficient, and according to the ratio of resin to porous backing material a dielectric constant within the range of about 3.6 to 4.

It has been known that the capacity obtainable in electric capacitors is inversely proportional to the distance between the plates and directly proportional to the dielectric constant of the material which forms the spacer or dielectric and it is of course desirable particularly in most high frequency applications to obtain the maximum capacity per unit volume without sacrificing other desirable electrical properties. It has been proposed that the dielectric constant of materials may be increased by introducing an additional material having a relatively high dielectric constant, such as titanium dioxide, for instance as is described in Patent 1,769,874—Boyer. Also in Patent 2,106,039—Safford, there is described a particular way of improving the dielectric constant of commercial titanium dioxide, and in mentioning that such material may be employed in various methods, the Safford patent states: "For example, 5 to 10% of the fired powder may be incorporated into paper at the time the paper is being made. Dielectric sheets may also be prepared by compounding the fired powder with synthetic resinous compositions such, for example, as alkyd resins."

Also in an attempt to minimize the deleterious effects of conductive material in commercial kraft paper for use in capacitors, it has been suggested that a coating of titanium dioxide and a suitable bonder of material such as polystyrene may be employed on the paper as a spacer to break the contact between the conductor particles of adjacent layers of the paper.

With the trend of the prior art, as evidenced by the above, we attempted to increase the dielectric constant of the dielectric film of the type described and claimed in the above mentioned Miller and Foster patent, which includes a paper sheet coated with a thermoplastic resin such as polyvinyl carbazole, by coating the paper with a resin into which had been mixed a fine powder of a high dielectric constant such as titanium dioxide. However, although some increase in dielectric constant of the resulting dielectric was obtained, contrary to expectations the resulting dielectric had other electrical properties which were decidedly inferior to the dielectric produced according to the teachings of the above Miller and Foster patent. Also since not a sufficient increase in dielectric constant was obtained as was to be expected by the addition of the high dielectric constant material and also because the resulting dielectric had unsatisfactory electrical properties, other attempts were made by coating paper with a resin to which has been added a high dielectric constant powder having a dielectric constant of approximately 100 times that of the one previously mentioned. The dielectric sheet which resulted also had inferior electrical properties and a dielectric constant which was not much greater than the sheet which employed the resin loaded with the relatively lower dielectric constant material.

It is therefore an object of our invention to provide a dielectric film of the above-mentioned type which not only has desirable electrical characteristics such as power factor with changes in temperature and frequency, and capacity and corona characteristics, but which also has a relatively high dielectric constant.

A further object of our invention is to provide an improved dielectric film suitable for high frequency capacitor use which is efficient in operation and simple to manufacture, and which has a minimum of wastage during manufacture.

A further object of our invention is to provide an improved method of forming dielectric sheet metal suitable for electric capacitors.

A still further object of our invention is to provide an improved electrical capacitor suitable for high frequency applications.

Although we have shown and described particular embodiments of our invention, we do not desire to be limited to the particular embodiments described, and we intend in the appended claims to cover all modifications which do not depart from the spirit and scope of our invention.

Figure 2:
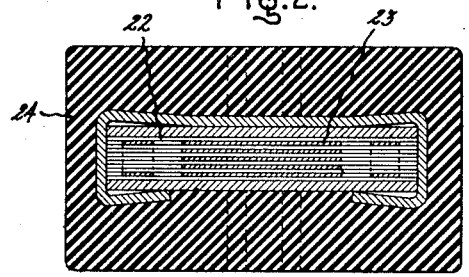
Figure 3:
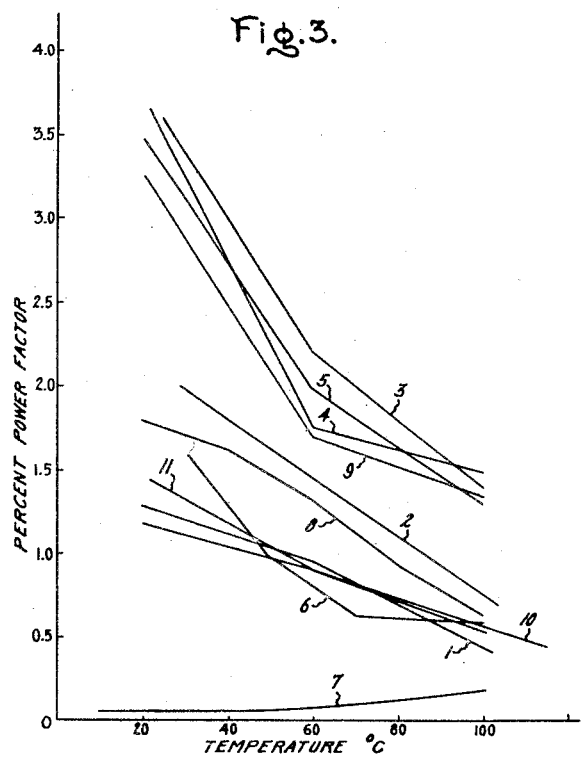
Figure 5:
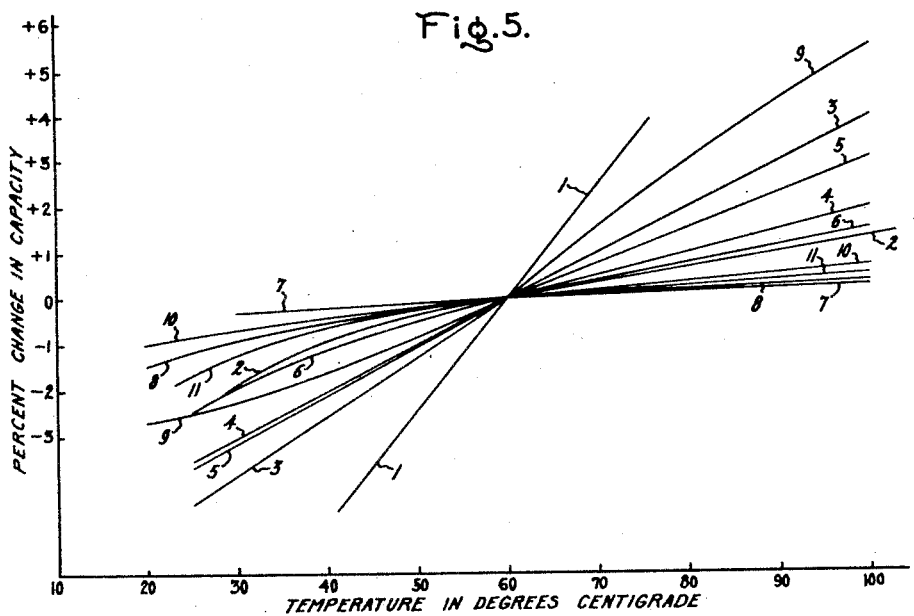
Figure 6:
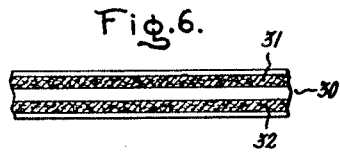
Figure 7:
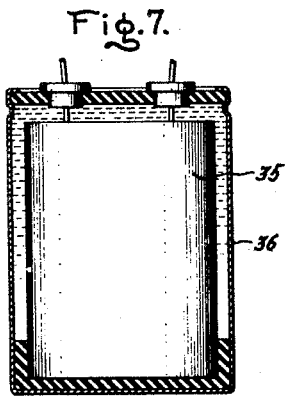
Figure 4:
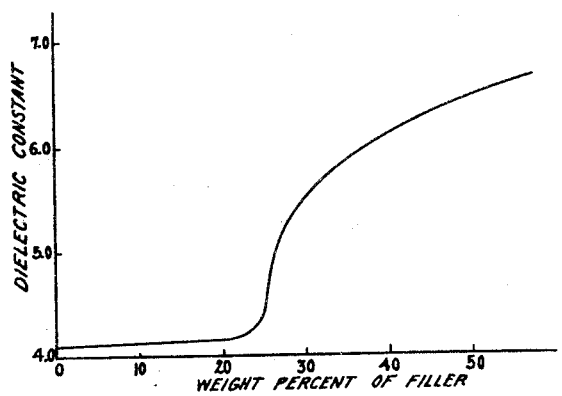
Figure 8:
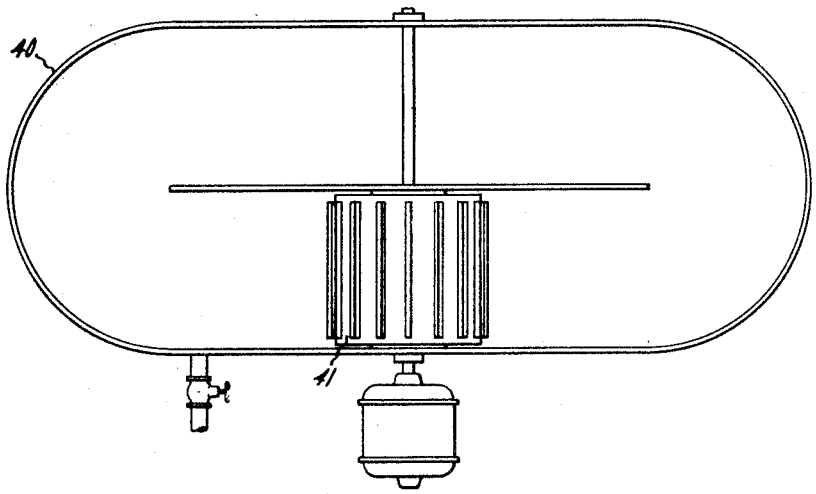
Figure 9:
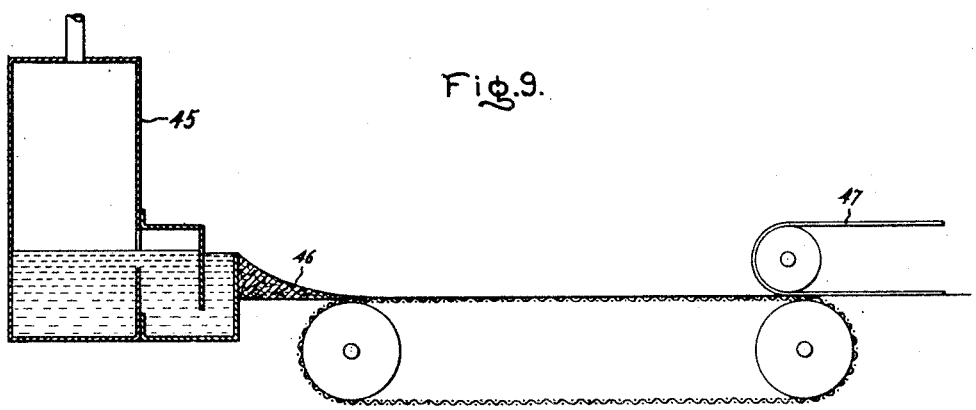

In the drawing, Fig. 1 is a perspective view of a rolled capacitor which is provided with an embodiment of our invention; Fig. 2 is a sectional side elevation of a stacked capacitor unit having a molded casing which is provided with an embodiment of our invention; Figs. 3, 4, and 5 illustrate curves of electrical characteristics which will be used in the explanation of our invention; Fig. 6 is a sectional side elevation of a fragment of a composite laminated dielectric formed according to our invention; Fig. 7 is a side elevation of a capacitor formed according to our invention, and Figs. 8 and 9 illustrate somewhat diagrammatically a beater and a conventional Fourdrinier paper making machine, respectively, which figures will be employed in the explanation of our improved method of forming a loaded dielectric.

As has been stated above, when a dielectric film was formed which included a flexible fibrous backer such as paper, coated with a suitable resinous material such as polyvinyl carbazole, which resin had mixed therewith a powder of a very high dielectric constant material, that not only was there only a relatively slight increase in dielectric constant of the finished product, but the electrical characteristics were decidedly inferior in that the material had a relatively high per cent change in capacity with changes in temperature and relatively high power factor with changes in temperature, as will be brought out more fully below. However, we have found that when forming thin dielectric films which include a suitable flexible material which may be formed into thin films, such as paper and which is coated or impregnated with a resinous material such as polyvinyl carbazole, that fillers having a high dielectric constant should be employed not just in the resinous coating as would be expected, when forming such a composite dielectric, but it is necessary to place such fillers in the paper backer. Furthermore, an improved method for so filling the paper backer will be described below. We further found that an improved dielectric film may be formed which includes a suitable thin fibrous or porous backer such as paper coated and impregnated with a high softening point low power factor resinous material including polyvinyl carbazole by loading only the paper and not the resinous coating with the high dielectric constant material. In order to obtain any effective increase in dielectric constant we have found it is necessary to load above a certain minimum, as will be described below. If it is desired the resin may also be loaded with the high dielectric constant material and when this is done we have found that the flexible material such as paper should also be filled with a comparable amount of the powder having the high dielectric constant as will be brought out in further detail below.

Our improved dielectric may be employed in an electric apparatus such as a capacitor in any suitable manner, and in Fig. 1 we have illustrated a conventional roll type capacitor having our improved film dielectric 20 which has been rolled with adjacent conducting plates 21. In Fig. 2 we have illustrated a stacked capacitor which includes our improved dielectric material 22 which has been stacked with adjacent superimposed conducting electrodes 23, the unit having a molded casing 24.

Any suitable loading material may be employed in forming our improved dielectric according to our invention, and suitable materials include titanium dioxide, barium titanate, strontium titanate, calcium titanate or in general, alkaline earth titanates may be used having the desirable characteristics. Furthermore, physical mixtures of these titanates and chemical compositions such as barium strontium titanate or barium titanate-strontium titanate or other alkaline earth titanates may be used in such chemical compositions. In addition these titanate compositions may be modified if desired with small percentages of other inorganic materials, such as zirconium oxide to give particular electrical properties.

A suitable dielectric tissue is one containing 28 to 30 per cent by weight of barium strontium titanate and 72 to 70 per cent kraft wood fibre, producing a finished sheet of .4 mil thick. When this dielectric is coated or impregnated with polyvinyl carbazole resin to .75 mil and used either alone or laminated together into multiple thicknesses, a useful high frequency dielectric sheet with good electrical properties is obtained. We have further formed dielectric films of less than .45 mil thick which contained between about 22 and 47 per cent by weight of the high dielectric constant inorganic powders.

The results of tests which indicate the characteristics of capacitors formed of a stacked variety, as illustrated in Fig. 2, and having dielectrics formed according to our invention, and which are compared with capacitors formed of dielectrics which were mentioned above as having undesirable electrical characteristics are given in Fig. 3, and which we have plotted per cent power factor versus temperature for capacitors having various materials as are itemized in the table given below:

| Film No. | Per cent Filler in Paper | Per cent Filler in Resin Impregnant | Filler Employed | Dielectric Constant |
|---|---|---|---|---|
| 1 | 47 | 25 | Barium strontium titanate | 6.8 |
| 2 | 30 | 25 | do | 5.5 |
| 3 | | 25 | Strontium titanate | 5.5 |
| 4 | | 25 | Calcium titanate | 5.2 |
| 5 | | 25 | Strontium titanate-lead titanate-zirconium oxide | 4.7 |
| 6 | Miller and Foster | | | 3.6–4.2 |
| 7 | Mica | | | 5.5–7.2 |
| 8 | 30 | | Barium strontium titanate | 5.5 |
| 9 | | 25 | do | 4.6 |
| 10 | 30 | 12 | do | 5.4 |
| 11 | 47 | | do | 6.8 |
| 12 | 22 | | do | 4.2 |
| 13 | 3.6 | | do | 4.1 |
| 14 | 7 | | do | 4.1 |

In the table given above, there is given in column 1, under film number, an identifying number of the dielectric which was employed in the capacitor. Column 2 gives the per cent filler in the paper and this percentage is the amount of filler by weight in per cent of the total weight of the paper sheet and filling material before the loaded paper is impregnated and coated with the resin. Column 3 gives the per cent filler in the resin impregnant, or is the percentage by weight in the impregnating bath to the total weight of the resin in the bath. Column 4 gives particular filler having the high dielectric constant employed to form each of the loaded dielectrics and column 5 gives the dielectric constant of the resulting composite dielectric. It will also be understood that the capacitors which were formed with the various dielectrics and which power factor characteristics are given in Fig. 3, had the same number of sheets of similar thickness and each of the capacitors had substantially the same clamping pressure, and the power factor values at various temperatures were obtained at approximately one megacycle.

Referring to Fig. 3 it will be seen that the capacitors with the films Nos 3, 4, 5, and 9 each have a relatively high power factor, while capacitors with dielectric films Nos. 8 and 11 have a much lower per cent power factor with changes in temperature. Referring to the tabulation it will be seen that the first groups of dielectrics having the high power factor, all have dielectric constant loading material only in the resin and not in the paper, whereas the dielectrics having the much better and usable power factor have loading in the paper. I have included the characteristics of mica which is No. 7 and material formed according to the Miller and Foster patent which is No. 6, for comparative purposes. It will further be seen that not only is a very slight improvement in per cent power factor obtained by adding the filling material to the resin coating, as well as the paper, as will be seen with films Nos. 2 and 10, but no further increase in dielectric constant obtains in such a composite dielectric.

It will be noted from the tabulation above that loading the paper with a high dielectric constant powder below about 22 per cent produces substantially no increase in dielectric constant of the fabricated film. In order to further show this, we are illustrating in Fig. 4, the change in dielectric constant with different amounts of filler, and it will be noted from the curve that there is a critical point at about 20 to 22 per cent by weight. The same filler, which was barium strontium titanate, was employed in each of the films and it will be understood that the per cent of filler in the paper refers to the amount by weight of the filler as compared with the total weight of the dielectric including the pulp and filler and before the dielectric has been coated or impregnated with the polyvinylcarbazole resin. Thus we desire to use a dielectric film which includes any suitable porous or fibrous backer material such as paper loaded with about 30 per cent by weight of high dielectric constant material, or from between about 20 or 22 to about 50 per cent by weight of the loading material or with the pulp loaded with a sufficient amount to produce at least a 10 to 12 per cent increase in dielectric constant over a similar unloaded film.

In Fig. 5 we have illustrated the characteristics of the same capacitors in which per cent change in capacity has been plotted against changes in temperature. Here again it will be seen that the curves of the materials of the sheet with no titanate in the paper which includes materials 3, 4, 5, and 9, have a large temperature coefficient while those with the titanate in the paper have a relatively low temperature coefficient. Also, there is plotted the characteristics of mica which is No. 7 and material formed according to Miller and Foster patent which is No. 6, for comparative purposes. From an inspection of Fig. 5 it will also be seen that not only is a better capacitor characteristic obtained when the paper is loaded with a high dielectric constant material but a still improved per cent change in capacity characteristic is obtained when only the paper is loaded, as will be noted from the characteristics of film No. 8 where kraft paper was employed containing 30 per cent barium strontium titanate by weight of the sheet including the fibre and filler and a coating of polyvinylcarbazole resin without any filler. Such a material compares very favorably with mica in this characteristic. Although we do not fully understand the reason as to why this unusual phenomenon should take place, it appears that the filler causes a change in the distribution of dielectric stress which appears to be more favorable from the point of view of this characteristic.

It will be further noted that capacitors formed with film No. 1, which has only about two-thirds the filler in the resin as is in the fibre of the composite film, as well as a relatively large amount of total filler, has a poor capacitance characteristic, while film No. 2 which has about the same amount of filler in the resin as is present in the fibre, as well as having a suitable amount of total filler, has a relatively lower capacitance change characteristic. Film No. 10 also has a relatively lower capacitance change characteristic with temperature since the total amount of filler employed is sufficiently small that even though the amounts used in the fibre and resin are unbalanced, since the major portion is in the fibre the dielectric stress is suitably proportioned even in this case. Thus No. 10 has only about 12 per cent filler in the impregnant which means the dielectric will have less than that percentage in the resin of the weight of the total dielectric, as the dielectric is made up of fibre as well as resin, and the amount of loader in the resin is not sufficiently large to effect substantially the stress distribution since it will act substantially as a dielectric loaded only in the fibre.

Referring to Fig. 6, we have illustrated a composite dielectric including a composite film 30 formed of two separate films 31 and 32 of paper loaded with barium strontium titanate and having coatings of polyvinylcarbazole, the films being calendered together under heat and pressure to form the composite film. We have further found that when the loading is employed that laminating to form a composite film may be obtained at lower temperatures and a stronger and better bonded sheet results. We are not sure why this is so but it appears that the inorganic fillers act as internal plasticizers for the resin impregnated in the fibres and hence the resin will flow more readily allowing a smoother surface and better bond.

It is to be understood that forming a film dielectric made according to our invention by loading the solid porous backer with a suitable high dielectric constant material and coating with a resinous material may also be carried out with any other suitable resinous materials which may not have all the desirable characteristics of polyvinylcarbazole such as polystyrene, methyl silicone, and low loss copolymers such as are obtained from styrene and divinyl benzene. Our improved dielectric may therefore be formed with any soluble low loss resin or with any resin, monomer or monomers of which, or the partly polymerized or condensed monomers of which, are soluble and which can be polymerized in place on a flexible backing.

Our improved capacitor construction may be employed either in the dry type as is illustrated in Fig. 2, or as shown in Fig. 7. There may be provided a capacitor such as a rolled type capacitor 35 including our improved dielectric which is immersed in a suitable dielectric liquid such as mineral oil and enclosed in a casing 36 and such a capacitor has a relatively long life particularly when connected to direct current, a typical life being such as about 3000 hours. When immersing in a liquid impregnant our improved loaded porous sheet such as loaded paper may be employed without the resin coating or resin impregnant.

We shall now describe an improved method which we have found produces a thin sheet of paper which is filled with a relatively high power factor organic material to amounts up to about 50 per cent. When making a thin capacitor tissue of 0.4 mil thick, the fibres, as is conventional are beaten down to a degree of gelatinization before the paper is made in a Fourdrinier machine. However, we have found that when paper films, for instance 0.4 mil, highly loaded with titanate bodies, for instance, up to 50 per cent are desired, a greater degree of gelatinization is necessary than in producing ordinary 0.4 mil paper. For example, a pulp suitably gelatinized for approximately 0.4 mil loaded paper which is to be loaded with about 28 per cent by weight of barium strontium titanate, we have found may be satisfactorily made when the pulp is beaten for a cycle which is best to produce a thinner paper, or about 0.35 mil with 100 per cent wood fibre paper.

It is customary in the paper making art to beat the pulp from which the paper is made to a particular degree of gelatinization, depending upon the thickness of the finished paper which is to be made. We have found, however, that when making a loaded paper intended to have a predetermined total thickness, a pulp which is to be combined with the loading powder should be beaten to a predetermined degree of gelatinization such as employed in conventional paper making corresponding to that degree which is usually employed for the thickness of the sheet without the filler.

Beating is usually carried out in a machine which includes a vat 40 as is illustrated somewhat diagrammatically in Fig. 8 and which has a rotatable beater roll 41 which is movable up and down. When the paper pulp in the vat 40 is gelatinized to the desirable amount, as is described above, the beater roller is raised slightly and the powdered titanate of a desirable size, such as ranging from 2 to 4 microns is added in such quantity so as to result in an amount which is approximately 10 per cent in excess of the amount which is desired in the loaded paper. For instance, if a thirty per cent loading of the paper is desired 33 per cent of titanates by weight is added to the beater. The retention on the paper making machine of the titanate in such exceedingly thin paper we have found is such that the right amount or about 30 per cent will be produced in the finished paper by the above procedure.

After the titanate body is added to the beater the resulting batch is circulated and mixed thoroughly under such conditions of pressure that no further gelatinization of the paper stock takes place. The batch is then placed in the stock chest and diluted to the desired consistency in the usual manner. From the stock chest the material is introduced directly into the head box 45 of a Fourdrinier machine, as is illustrated diagrammatically in Fig. 9, omitting the usual brushing and cutting operation which is normally carried out in the Jordan machine to produce conventional paper. From the head box the diluted stock is introduced on the Fourdrinier wire over a rubber apron 46 and a sheet formed satisfactorily at only slightly lower speeds than those used in conventional thin paper making. By the use of a pick-up felt 47 at the end of the Fourdrinier wire, loaded paper less than .5 of a mil thick may be taken off the wire on a standard paper making machine and transferred to the suitable drying calender stacks without breakage. This behavior was very unexpected because the sheet at this stage may be more than half water, one-fourth inorganic loading material, and only one-fourth gelatinized wood fibre. With the proper beat as described, the sheet will not break at this point.

Although we have shown and described particular embodiments of our invention, we do not desire to be limited to the particular embodiments described, and we intend in the appended claims to cover all modifications which do not depart from the spirit and the scope of our invention.

What we claim as new and desire to secure by Letters Patent of the United States is:

1. A dielectric material including wood fiber paper loaded with barium strontium titanate powder to at least about 20 per cent by weight of the weight of the sheet and loading powder, and a coating of resinous material.

2. A dielectric material including paper having a thickness less than about 10 mils including a mixture of cellulosic pulp and at least 20% by weight of alkaline earth titanate powder, said sheet having a coating of a resinous material including polyvinylcarbazole, said dielectric having a dielectric constant at least about 12 per cent higher than that of a similar unloaded sheet.

3. A dielectric material including a cellulosic porous sheet material having a thickness less than about 10 mils including a mixture of cellulosic pulp and a barium strontium titanate powder, said mixture of pulp and powder being in the proportion of at least about 20 per cent by weight of powder, and polyvinylcarbazole resinous material coating and impregnating said sheet.

4. Wood fiber paper which is suitable for dielectric purposes consisting of a mixture of wood pulp loaded with finely-divided barium strontium titanate constituting about 30% by weight of the loaded paper and a coating on said paper of resinous material characterized by low dielectric loss.

EDWARD A. KERN.
HARRY F. MILLER.

REFERENCES CITED

The following references are of record in the file of this patent:

UNITED STATES PATENTS

| Number | Name | Date |
|---|---|---|
| 1,781,033 | Ruben | Nov. 11, 1930 |
| 2,154,995 | Rawling | Apr. 18, 1939 |
| 1,956,314 | Carter, Jr. | Apr. 24, 1934 |
| 2,281,602 | Ruben | May 5, 1942 |
| 2,287,348 | Hayden, Jr. | June 23, 1942 |
| 2,072,465 | Reppe et al. | Mar. 2, 1937 |
| 2,106,039 | Safford | Jan. 18, 1938 |
| 2,277,733 | Wainer | Mar. 31, 1942 |

FOREIGN PATENTS

| Number | Country | Date |
|---|---|---|
| 1,897 | British | 1890 |
| 520,701 | British | May 1, 1940 |
| 752,628 | French | June 22, 1932 |
| 409,354 | British | Apr. 30, 1934 |

OTHER REFERENCES

The Manufacture of Pulp and Paper, vol. 4, 3rd ed. (1939) sec. 4, page 4. Published by McGraw Hill Book Co. New York, N. Y.

Paper Trade Journal, April 11, 1929, page 54.

Pulp and Paper Magazine of Canada, Nov. 1936, page 689.